US006967989B2

(12) United States Patent
Gorday et al.

(10) Patent No.: US 6,967,989 B2
(45) Date of Patent: Nov. 22, 2005

(54) METHOD AND APPARATUS FOR TIME-SHARING A RAKE RECEIVER STRUCTURE

(75) Inventors: Robert Gorday, Wellington, FL (US); Clinton C Powell, Austin, TX (US); David Taubenheim, Deerfield Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 685 days.

(21) Appl. No.: 10/150,844

(22) Filed: May 17, 2002

(65) Prior Publication Data

US 2003/0215002 A1     Nov. 20, 2003

(51) Int. Cl.[7] ............... H04B 1/69; H04B 7/216; H03K 9/00
(52) U.S. Cl. ............ 375/147; 375/150; 375/316; 370/320; 370/335; 370/342
(58) Field of Search ................ 370/342, 204, 370/209; 375/200, 343, 148, 147; 455/434

(56) References Cited

U.S. PATENT DOCUMENTS

| | | | | |
|---|---|---|---|---|
| 5,684,793 A | * | 11/1997 | Kiema et al. | 370/335 |
| 5,764,688 A | * | 6/1998 | Hulbert et al. | 375/206 |
| 6,026,115 A | * | 2/2000 | Higashi et al. | 375/148 |
| 6,078,611 A | | 6/2000 | La Rosa et al. | 375/206 |
| 6,125,137 A | | 9/2000 | Wang et al. | 375/148 |
| 6,229,841 B1 | | 5/2001 | Levin et al. | 375/147 |
| 6,269,075 B1 | | 7/2001 | Tran | 370/206 |
| 6,470,000 B1 | * | 10/2002 | Burns et al. | 370/342 |
| 6,504,816 B1 | * | 1/2003 | Lee et al. | 370/204 |
| 6,574,472 B1 | * | 6/2003 | Scheinert | 455/434 |
| 6,683,924 B1 | * | 1/2004 | Ottosson et al. | 375/343 |
| 6,724,719 B1 | * | 4/2004 | Tong et al. | 370/209 |
| 2002/0018515 A1 | * | 2/2002 | Ricken et al. | 375/130 |
| 2002/0181558 A1 | * | 12/2002 | Ogawa et al. | 375/147 |
| 2004/0120386 A1 | * | 6/2004 | Grilli et al. | 375/148 |

FOREIGN PATENT DOCUMENTS

| EP | 1014593 A2 | * | 6/2000 | .......... H04B 1/707 |
|---|---|---|---|---|
| JP | 2002118492 | * | 4/2002 | .......... H04B 1/707 |

OTHER PUBLICATIONS

Y. Miki and M. Sawahashi, "Combination performance of truncated decorrelator and coherent Rake receiver for DS-CDMA", IEEE Electronics Letters, Sep. 14, 1995, vol. 31, No. 19, p. 1628-1630.*
Mark F. Kahn and William A Gardner, "A Time-Channelized Programmable Canonical Correlation Analyzer", 1996, IEE Proccedings of ASILOMAR-29.*
Wilbur L. Myrick et al, "MMSE Correlator Based Rake Reciever For DS-CDMA", Military Communications Conference, 2001. MILCOM 2001. IEEE vol. 2, Oct. 28-31, 2001 pp.: 1418 □□- 1422 vol. 2.*

* cited by examiner

*Primary Examiner*—Stephen Chin
*Assistant Examiner*—Linda Wong

(57) ABSTRACT

A processor (216) time-shares correlators (206) to process (402) pilot channels for a plurality of branches to derive pilot symbols for each of the plurality of branches before processing control and data channels. The processor and the correlators cooperate to determine (404) from the pilot symbols a timing estimate for each of the plurality of branches. A signal quality estimator (210) determines (406) from the pilot symbols a signal quality for each of the plurality of branches. Subsequently, the processor cooperates with the correlators to process (408) the control and data channels of the plurality of branches, in an order determined by a plurality of branch attributes including at least one of the signal quality and the timing estimate determined for each of the plurality of branches.

24 Claims, 2 Drawing Sheets

-PRIOR ART- 100

METHOD AND APPARATUS FOR TIME-SHARING A RAKE RECEIVER STRUCTURE

FIELD OF THE INVENTION

This invention relates in general to wireless data communication systems, and more specifically to a method and apparatus for time-sharing a rake receiver structure.

BACKGROUND OF THE INVENTION

Next generation wireless products are being designed with modem architectures capable of supporting many wireless protocols. In order to minimize the cost, power, and size of these multi-mode modems, these architectures will be designed for increased software configurability with a minimized set of hardware resources necessary for implementing a set of wireless protocols. The general term Software Definable Radio (SDR) is often used for these new modem architectures.

Cost and power considerations have led to the high use of dedicated hardware designs in today's portable devices, especially for CDMA (Code Division Multiple Access) protocols which require tens of billions of operations per second for baseband signal processing. In particular, modem chip rate processing used in rake receiver structures has traditionally been implemented in highly optimized and customized hardware designs. Such optimized hardware designs are not easily translated to general-purpose architectures found in the SDR. This is primarily because a general-purpose architecture contains a relatively small number of generic parallel operations (e.g., arithmetic logic units, multipliers, timers, etc.), and the large number of parallel operations in dedicated hardware designs must be serialized for the SDR. Since the algorithms and processing steps must be modified, it is important to examine and exploit any possible advantage of the software implementation to minimize any increase in size or power.

Thus, what is needed is a method and apparatus for time-sharing a rake receiver structure. The method and apparatus preferably will minimize any increase in size or power due to a transition from a dedicated hardware configuration to an SDR configuration.

DETAILED DESCRIPTION

Figure 1:
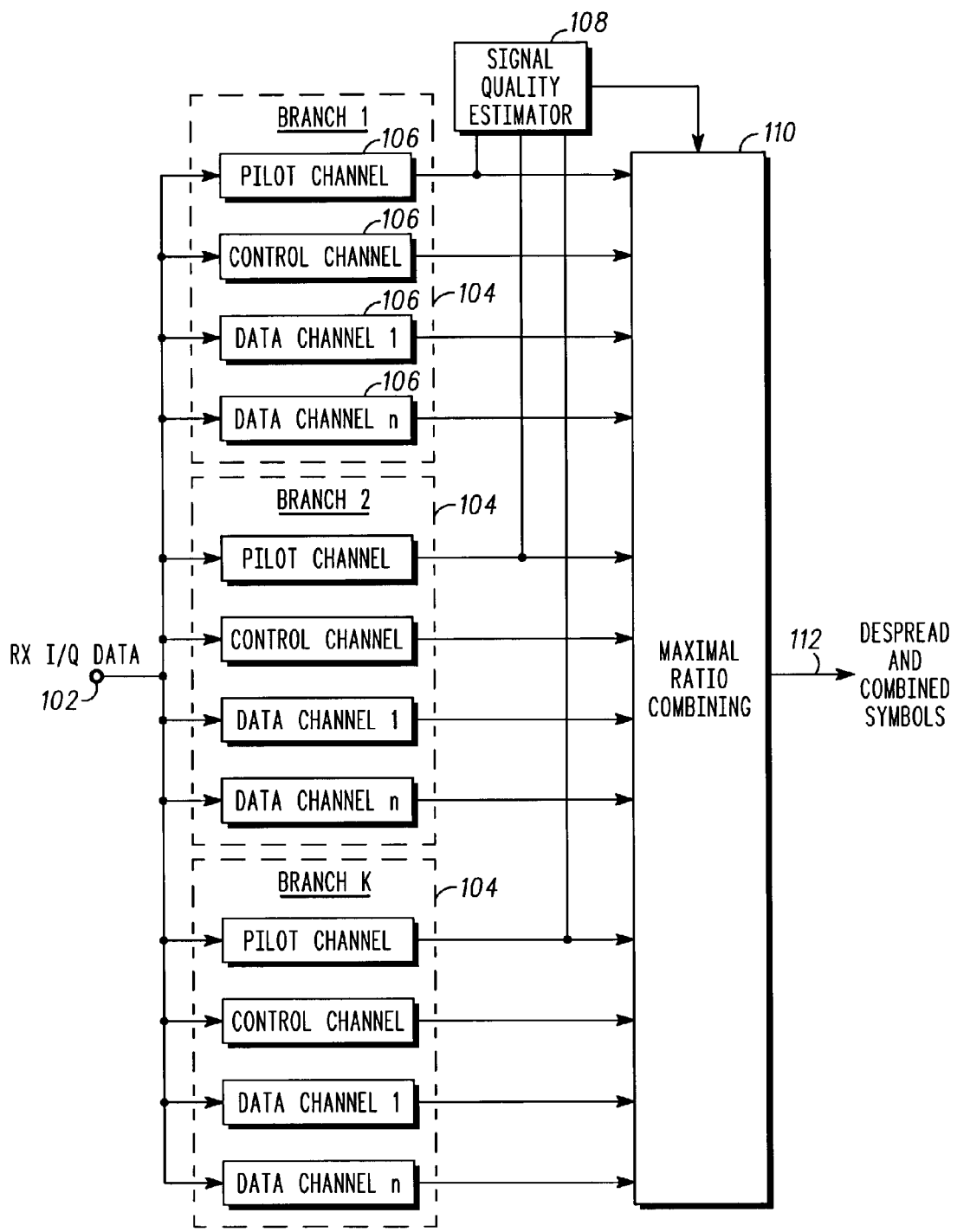
FIG. 1 is an electrical block diagram of a prior-art rake receiver architecture.

Referring to FIG. 1, an electrical block diagram 100 depicts a prior-art rake receiver architecture. The diagram 100 illustrates a traditional implementation for a WCDMA (Wideband CDMA) Rake Receiver structure in dedicated hardware. For the purpose of illustration, consider an example implementation including k=8 rake branches 104, where each branch 104 simultaneously processes six different WCDMA channels, comprising a common pilot channel, a common control channel, and four different data channels. Thus, the implementation includes 8×6=48 separate hardware correlators 106 of the type illustrated in the diagram 100.

Each of the hardware correlators 106 processes the input samples at a baseband input 102 simultaneously, so no input buffer is required. The despread symbols out of each correlator 106 are buffered for use by the maximal ratio combiner (MRC) 110, which uses a signal-to-noise ratio ($E_b/N_o$) or signal-to-interference ratio (SIR) estimate generated for each branch 104 by a signal quality estimator 108, to produce a weighted sum of the symbols from each branch 104 at an output 112. Each branch 104 is configured to track a different multi-path ray (or one of multiple antenna inputs), so each branch potentially has a different path delay. Buffering (not shown) is used in order to time-align symbols from different branches 104 for the MRC function.

It is important to note that, in the prior-art hardware implementation depicted in the diagram 100, all the functions execute simultaneously, and the signal quality estimates used for MRC and chip-timing adjustments are made using delay loops. In simple terms, this means that the hardware functions for estimating SNR and estimating timing offsets are performed over a window of despread symbols, and the adjustments are made at the end of that window, delayed by the length of the window.

Figure 2:
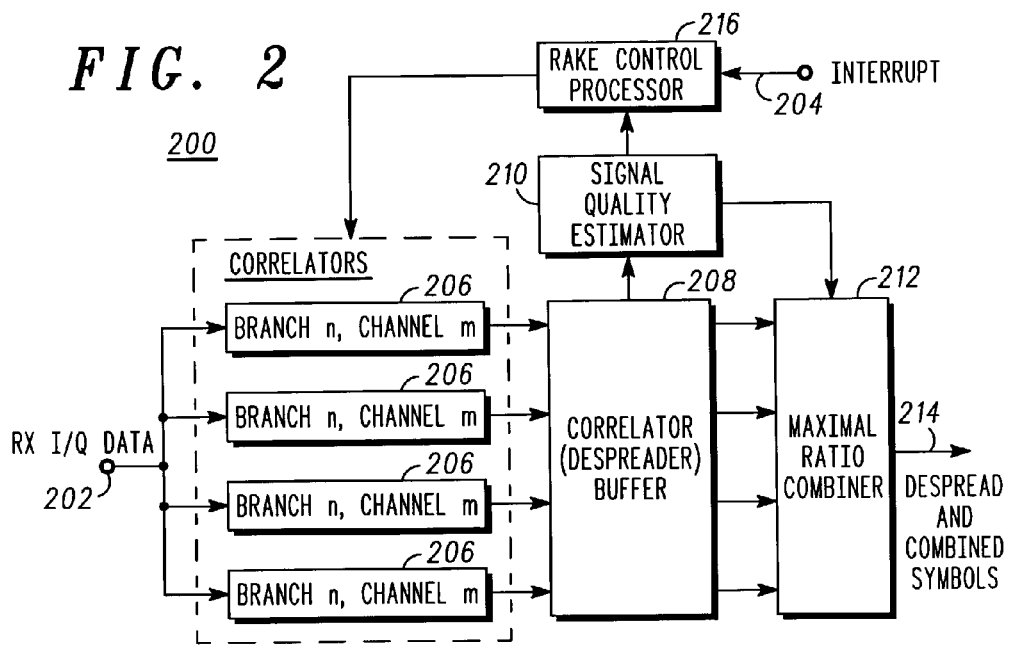
FIG. 2 is an electrical block diagram of an exemplary rake receiver architecture in accordance with the present invention.

Referring to FIG. 2, an electrical block diagram depicts an exemplary rake receiver architecture 200 in accordance with the present invention. The architecture 200 preferably comprises a rake control processor 216 and a conventional set of reconfigurable (i.e., programmable) general-purpose logic that is configured to implement a small number of correlators 206 at one time. Assuming that the small number of correlators (K) is less than the number (N) of simultaneous correlators required for complete processing of the block of input data samples (N=48 in the previous example for processing 8 rake branches), time-sharing of the correlators 206 is necessary. The architecture 200 preferably also includes a conventional correlator buffer 208 for time-aligning the outputs of the time-shared correlators 206 for input to a conventional maximal ratio combiner (MRC) 212 having an output 214. A conventional signal quality estimator 210 is coupled to the correlators 206 for determining a signal quality (e.g., SIR or $E_b/N_o$) for each of the branches, the signal quality determined from the corresponding pilot symbols of the branch.

Time-sharing the reconfigurable resources introduces some overhead and inefficiency. This applies to time-sharing the small set of K correlators to sequentially perform all required correlations as well as time-sharing the correlator functions with other modem functions. A primary result of the time-sharing is that a conventional input buffer (not shown) is used to hold a block of samples at the input 202 to be processed multiple times for the N correlations required. While this input buffer adds area and cost to the design, it also advantageously introduces the option to select the order in which the rake correlations are executed. This new option was not a consideration in the prior-art hardware design where all correlations were executed simultaneously. Given this option, the following novel possibilities for correlation execution have been identified:

i) Process all pilot channel correlations first. Since the general purpose implementation can process only a small number of correlations simultaneously, the order of processing the N (e.g., 48) correlations for a block of received samples can be specified such that the pilot channels (1 per branch, e.g., for 8 branches) are processed before the control and data channels. The signal quality and timing offset estimates are made using only the pilot channel samples. Processing the pilot channel samples first introduces the benefit that MRC and timing adjustments on a block of samples are made using SNR and timing estimates from that same block. Thus, delay is removed from the control loop. Also, since signal quality estimates based on the pilot channel symbols are used in the forward link power control algorithm, processing the pilots first advantageously will reduce the feedback time for the power control loop.

ii) Further exploit the idea of selecting beneficial order-of-processing for the correlators 206 to improve flexibility, robustness, and power efficiency. The data channel correlations can be processed in the order of descending signal quality, based on signal quality estimates made on the pilot channel symbols. In doing this, if the rake correlator processing must be interrupted or terminated early by another task (e.g., via the interrupt line 204), at least the strongest multi-path components of the rake receiver will be included in the MRC algorithm. One possible modification to a processing order of decreasing signal quality is that a SNR or C/I threshold may be set, such that only the correlations from branches exceeding the SNR or C/I will be processed during each block of samples.

iii) As an alternative to the order of processing of correlations based only on decreasing signal quality (ii), there are scenarios (e.g. soft hand-off) where other information should be used to determine the order of correlation processing. This information includes base station ID for each branch, time-of-arrival (based on the timing estimates) for each branch, and channel access information that indicates which of the branches (because of the base station ID being tracked) has more priority. Therefore, for scenarios where groups of branches are assigned to track different base stations, the rake controller processor 216 can maintain a table of the branches and associated priority of processing that is a function of associated base station and signal quality. Two example methods of priority include: (1) process all correlations for all branches of a primary base station before processing any correlations of secondary base stations, and (2) process correlations in an order that processes the best branch (based on a predetermined branch attribute) from each base station before processing secondary branches from each base station.

iv) A further benefit that improves the flexibility and robustness of the software implementation is that if any correlation is interrupted in a way that prevents it from producing valid output symbols, the output symbols from that correlation are zero-weighted for the MRC algorithm. Alternatively, the results of the interrupted correlator can be identified and ignored by the MRC algorithm. Examples include DMA (Direct Memory Access) contention, which prevents memory access during the processing of a particular correlation, and an operating system interrupt to abort a correlation to preserve other processing priorities.

It will be appreciated that the rake receiver architecture 200 also can be realized in part or in its entirety in a conventional digital signal processor (DSP) readily programmed by one of ordinary skill in the art, given the teachings of this disclosure. It will be further appreciated that, alternatively, the rake receiver architecture 200 can be realized as a custom integrated circuit, arranged and programmed in accordance with the present invention. Yet another embodiment of the rake receiver architecture 200 is a software program that when installed and executing on a processor causes the processor to form a rake receiver function in accordance with the present invention. It will also be appreciated that in some applications the pilot channel is combined with the control channel and processed as a single channel. In these applications the combined pilot/control channel is processed first, in accordance with the present invention.

Figure 3:
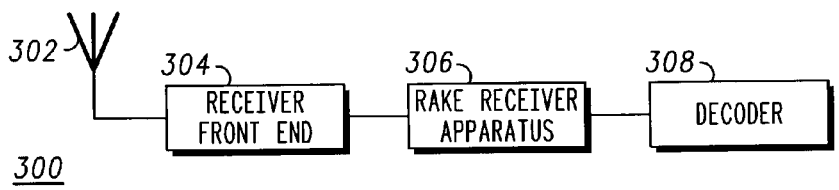
FIG. 3 is an electrical block diagram of an exemplary wireless receiver in accordance with the present invention.

FIG. 3 is an electrical block diagram of an exemplary wireless receiver 300 in accordance with the present invention. The receiver 300 comprises a conventional receiver front end 304 for down-converting a wireless signal intercepted by a conventional antenna 302. The receiver 300 further includes a rake receiver apparatus 306 comprising the rake receiver architecture 200, coupled to the receiver front end 304 for performing a rake receiver function on the wireless signal, in accordance with the present invention. In addition, the receiver 300 further includes a conventional decoder 308 coupled to the rake receiver apparatus 306 for performing symbol-rate processing on the despread and combined symbol output of the rake receiver apparatus 306 to decode the information carried by the wireless signal.

Figure 4:
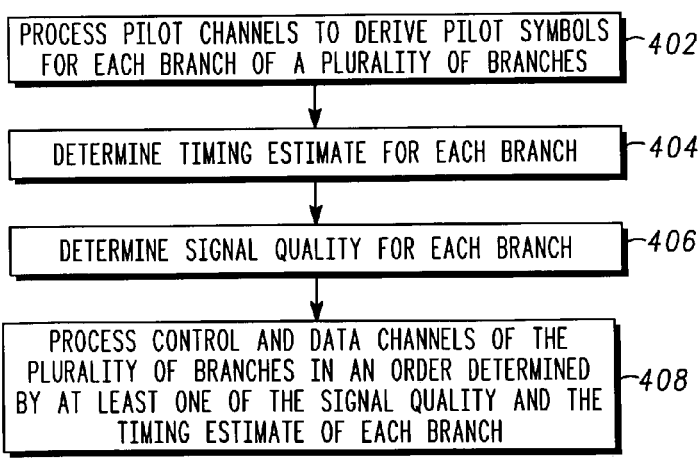
FIG. 4 is a flow diagram depicting operation of the rake receiver architecture in accordance with the present invention.

FIG. 4 is a flow diagram 400 depicting operation of the rake receiver architecture 200 in accordance with the present invention. The flow begins with the processor 216 controlling the K correlators 206 to process 402 the pilot channels for the plurality of branches to derive the pilot symbols for each of the plurality of branches before processing the control and data channels. The processor 216 and the K correlators 206 then cooperate further to determine 404 a timing estimate for each of the plurality of branches from the corresponding pilot symbols. The signal quality estimator 210 then determines 406 the signal quality for each of the plurality of branches, also from the corresponding pilot symbols. Subsequently, the processor 216 and the K correlators 206 cooperate to process 408 the control and data channels of the plurality of branches by the K correlators, in an order determined by a plurality of branch attributes comprising at least one of the signal quality and the timing estimate determined for each of the plurality of branches.

In one embodiment, the processor 216 and the K correlators 206 process the data channels in order of decreasing signal quality. In another embodiment, the processor 216 and the K correlators 206 process the control channels in order of decreasing signal quality. These two embodiments advantageously produce better results for the data channels and the control channels, respectively, should the processing be interrupted prematurely before completion. The ability to handle an interrupt gracefully is an important feature in a software definable radio, which uses a pool of hardware that is shared by many tasks via flexible software control.

In a third embodiment, the processor 216 and the K correlators 206 process only the control and data channels of branches in which the signal quality is above a predetermined threshold. This advantageously can reduce the processing power required for rake receiver processing, freeing the processing power for other tasks that may be needed in the wireless receiver 300.

In a fourth embodiment, the processor 216 determines (e.g., from the control channel) the base station identifier corresponding to a branch of the plurality of branches, and cooperates with the K correlators 206 to process the data channels in an order determined by the base station identifier. In a first version of the fourth embodiment, the processor 216 cooperates with the K correlators 206 to determine a first base station identifier corresponding to the branch having a most desirable branch attribute (based upon at least one of the signal quality and the timing estimate), and to process all branches corresponding to the first base station identifier before processing any branches corresponding to a second base station identifier. In a second version of the fourth embodiment, the processor 216 cooperates with the K correlators 206 to determine for each base station identifier a corresponding best branch defined as having a most desirable branch attribute, and to process for each base station identifier the corresponding best branch, before processing a less desirable branch corresponding to the base station identifier.

In a fifth embodiment, the processor 216 and the correlators 206 cooperate to detect an invalid branch result during the correlation processing of a channel of one of the plurality of branches; and to remove the invalid branch result from a combined result representing all valid branches of said channel. This can be accomplished, for example, by assigning a zero weight to the invalid branch result before applying the maximal ratio combiner process.

It will be appreciated that all non-conflicting combinations of the preceding embodiments can be used as well. It will be further appreciated that one of ordinary skill in the art can imagine many additional alternative variations in the processing order of the data channels, as well as the termination of the processing, based on combinations of signal quality, timing estimate, and base station identifier.

Thus, it should be clear from the preceding disclosure that the present invention provides a method and apparatus for time-sharing a rake receiver structure. The method and apparatus advantageously minimizes the increase in size and power associated with the transition from a dedicated hardware configuration to a software defined radio (SDR) configuration through an intelligent time-sharing of common resources.

This disclosure is intended to explain how to fashion and use various embodiments in accordance with the invention rather than to limit the true, intended, and fair scope and spirit thereof. The foregoing description is not intended to be exhaustive or to limit the invention to the precise forms disclosed. Many modifications and variations of the present invention are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for use in a rake receiver structure having K correlators, the method for time-sharing the K correlators to process correlation of a block of input samples of pilot, control, and data channels of a plurality of branches requiring N correlations for complete processing of said block, wherein K is less than N, the method comprising for said block of input samples the steps of:
    processing the pilot channels for the plurality of branches by the K correlators to derive pilot symbols for each of the plurality of branches before processing the control and data channels;
    determining a timing estimate for each of the plurality of branches from said pilot symbols;
    determining a signal quality for each of the plurality of branches from said pilot symbols; and
    subsequently processing the control and data channels of the plurality of branches by the K correlators, in an order determined by a plurality of branch attributes comprising at least one of the signal quality and the timing estimate determined for each of the plurality of branches.

2. The method of claim 1, wherein the step of processing the control and data channels comprises the step of processing the data channels in order of decreasing signal quality.

3. The method of claim 1, wherein the step of processing the control and data channels comprises the step of processing the control channels in order of decreasing signal quality.

4. The method of claim 1, wherein the step of processing the control and data channels comprises the step of processing only the control and data channels of branches in which the signal quality is above a predetermined threshold.

5. The method of claim 1, further comprising the steps of
    detecting an invalid branch result during correlation processing of a channel of one of the plurality of branches; and
    removing said invalid branch result from a combined result representing all valid branches of said channel.

6. The method of claim 1, further comprising the step of
    determining a base station identifier corresponding to a branch of the plurality of branches, and
    wherein the step of processing the control and data channels comprises the step of
    processing the data channels in an order determined by the base station identifier.

7. The method of claim 6, wherein the step of processing the data channels comprises the steps of:
    determining a first base station identifier corresponding to the branch having a most desirable branch attribute; and
    processing all branches corresponding to the first base station identifier before processing any branches corresponding to a second base station identifier.

8. The method of claim 6, wherein the step of processing the data channels comprises the steps of:
    determining for each base station identifier a corresponding best branch defined as having a most desirable branch attribute; and
    processing for each base station identifier the corresponding best branch, before processing a less desirable branch corresponding to the base station identifier.

9. An integrated circuit for use in a rake receiver, the integrated circuit for time-sharing K correlators to process correlation of a block of input samples of pilot, control, and data channels of a plurality of branches requiring N correlations for complete processing of said block, wherein K is less than N, the integrated circuit comprising:
    a processor;
    the K correlators coupled to the processor for processing the pilot channels for the plurality of branches to derive pilot symbols for each of the plurality of branches before processing the control and data channels; and
    a signal quality estimator coupled to the K correlators and coupled to the processor for determining a signal quality for each of the plurality of branches from said pilot symbols,
    wherein the processor is programmed to:
    cooperate with the K correlators to determine a timing estimate for each of the plurality of branches from said pilot symbols; and
    cooperate further with the K correlators to subsequently process the control and data channels of the plurality of branches, in an order determined by a plurality of branch attributes comprising at least one of the signal quality and the timing estimate determined for each of the plurality of branches.

10. The integrated circuit of claim 9, wherein the processor is further programmed to cooperate with the K correlators to process the data channels in order of decreasing signal quality.

11. The integrated circuit of claim 9, wherein the processor is further programmed to cooperate with the K correlators to process the control channels in order of decreasing signal quality.

12. The integrated circuit of claim 9, wherein the processor is further programmed to cooperate with the K correlators to process only the control and data channels of branches in which the signal quality is above a predetermined threshold.

13. The integrated circuit of claim 9, wherein the processor is further programmed to:
   detect an invalid branch result during correlation processing of a channel of one of the plurality of branches; and
   remove said invalid branch result from a combined result representing all valid branches of said channel.

14. The integrated circuit of claim 9, wherein the processor is further programmed to:
   determine a base station identifier corresponding to a branch of the plurality of branches; and
   cooperate with the K correlators to process the data channels in an order determined by the base station identifier.

15. The integrated circuit of claim 14, wherein the processor is further programmed to:
   determine a first base station identifier corresponding to the branch having a most desirable branch attribute; and
   cooperate with the K correlators to process all branches corresponding to the first base station identifier before processing any branches corresponding to a second base station identifier.

16. The integrated circuit of claim 14, wherein the processor is further programmed to:
   determine for each base station identifier a corresponding best branch defined as having a most desirable branch attribute; and
   cooperate with the K correlators to process for each base station identifier the corresponding best branch, before processing a less desirable branch corresponding to the base station identifier.

17. A software program that when installed and executing on a processor causes the processor to form a rake receiver function having K correlators, the processor time-sharing the K correlators to process correlation of a block of input samples of pilot, control, and data channels of a plurality of branches requiring N correlations for complete processing of said block, wherein K is less than N, the software program further causing the processor, for said block of input samples, to:
   process the pilot channels for the plurality of branches by the K correlators to derive pilot symbols for each of the plurality of branches before processing the control and data channels;
   determine a timing estimate for each of the plurality of branches from said pilot symbols;
   determine a signal quality for each of the plurality of branches from said pilot symbols; and
   subsequently process the control and data channels of the plurality of branches by the K correlators, in an order determined by a plurality of branch attributes comprising at least one of the signal quality and the timing estimate determined for each of the plurality of branches.

18. The software program of claim 17, further causing the processor to process the data channels in order of decreasing signal quality.

19. The software program of claim 17, further causing the processor to process only the control and data channels of branches in which the signal quality is above a predetermined threshold.

20. The software program of claim 17, further causing the processor to:
   determine a base station identifier corresponding to a branch of the plurality of branches; and
   process the data channels in an order determined by the base station identifier.

21. A wireless receiver, comprising:
   a receiver front end for down-converting a wireless signal; and
   an apparatus, coupled to the receiver front end, for performing a rake receiver function on the wireless signal, the apparatus for time-sharing K correlators to process correlation of a block of input samples of pilot, control, and data channels of a plurality of branches requiring N correlations for complete processing of said block, wherein K is less than N, the apparatus comprising:
      a processor;
      the K correlators coupled to the processor for processing the pilot channels for the plurality of branches to derive pilot symbols for each of the plurality of branches before processing the control and data channels; and
      a signal quality estimator coupled to the K correlators and coupled to the processor for determining a signal quality for each of the plurality of branches from said pilot symbols,
   wherein the processor is programmed to:
      cooperate with the K correlators to determine a timing estimate for each of the plurality of branches from said pilot symbols: and
      cooperate further with the K correlators to subsequently process the control and data channels of the plurality of branches, in an order determined by a plurality of branch attributes comprising at least one of the signal quality and the timing estimate determined for each of the plurality of branches.

22. The wireless receiver of claim 21, wherein the processor is further programmed to cooperate with the K correlators to process the data channels in order of decreasing signal quality.

23. The wireless receiver of claim 21, wherein the processor is further programmed to cooperate with the K correlators to process only the control and data channels of branches in which the signal quality is above a predetermined threshold.

24. The wireless receiver of claim 21, wherein the processor is further programmed to:
   determine a base station identifier corresponding to a branch of the plurality of branches, and
   cooperate with the K correlators to process the data channels in an order determined by the base station identifier.

* * * * *